US012565848B2

(12) United States Patent
Choi et al.

(10) Patent No.: US 12,565,848 B2
(45) Date of Patent: Mar. 3, 2026

(54) EXHAUST APPARATUS FOR AGRICULTURAL WORK VEHICLE AND AGRICULTURAL WORK VEHICLE

(71) Applicant: LS MTRON LTD., Anyang-si (KR)

(72) Inventors: Jong Jae Choi, Anyang-si (KR); Han Yeol Yu, Anyang-si (KR); Maengchan Jeong, Anyang-si (KR); Joon Hyung Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 297 days.

(21) Appl. No.: 18/377,871

(22) Filed: Oct. 9, 2023

(65) Prior Publication Data

US 2024/0125265 A1 Apr. 18, 2024

(30) Foreign Application Priority Data

Oct. 14, 2022 (KR) ........................ 10-2022-0132284

(51) Int. Cl.

| | |
|---|---|
| ***F01N 13/18*** | (2010.01) |
| ***F02M 35/10*** | (2006.01) |
| ***F02M 35/16*** | (2006.01) |

(52) U.S. Cl.

CPC ... *F01N 13/1827* (2013.01); *F02M 35/10222* (2013.01); *F02M 35/164* (2013.01)

(58) Field of Classification Search

CPC .. F01N 13/1827; F01N 13/18; F01N 13/1805; F01N 13/1822; F01N 13/1811; F01N 13/00; F01N 2590/08; F02M 35/10222; F02M 35/164; F02M 35/10209; F02M 35/10242; F02M 35/10; F02M 35/16; F02M 35/161; B60Y 2200/22

See application file for complete search history.

(56) References Cited

U.S. PATENT DOCUMENTS

| | | | | |
|---|---|---|---|---|
| 4,060,143 A * | 11/1977 | Matsumoto | B60K 13/04 181/207 |
| 5,832,726 A * | 11/1998 | Rees | F01N 13/08 181/243 |
| 6,095,460 A * | 8/2000 | Mercer | F01N 13/1822 248/608 |
| 6,983,728 B1 | 1/2006 | Banks, Jr. et al. | |

(Continued)

FOREIGN PATENT DOCUMENTS

| | | |
|---|---|---|
| JP | 2004124883 A | 4/2004 |
| JP | 2014077383 A | 5/2014 |
| JP | 2018141416 A | 9/2018 |

*Primary Examiner* — James M Dolak

(74) *Attorney, Agent, or Firm* — K&L Gates LLP

(57) ABSTRACT

Disclosed herein is an exhaust apparatus for an agricultural work vehicle. The exhaust apparatus for an agricultural work vehicle includes: a muffler configured to reduce the noise that is generated in the process in which the exhaust gas generated in the engine of an agricultural work vehicle is discharged out of the agricultural work vehicle; an intake part coupled to each of the engine and the muffler in order to transfer the exhaust gas, generated in the engine, to the muffler; an exhaust part coupled to the muffler in order to discharge the exhaust gas, having passed through the muffler, out of the agricultural work vehicle; and a vibration reduction part coupled to each of the intake part and the muffler in order to reduce the vibration of the muffler.

7 Claims, 5 Drawing Sheets

(56) References Cited

U.S. PATENT DOCUMENTS

| | | | | |
|---|---|---|---|---|
| 7,717,205 | B2 * | 5/2010 | Kertz | F01N 13/009 180/69.2 |
| 8,047,328 | B1 * | 11/2011 | Milewicz | B29C 66/1122 181/246 |
| 8,191,668 | B2 * | 6/2012 | Keane | F01N 13/1822 180/309 |
| 8,381,865 | B2 * | 2/2013 | Okada | E02F 9/00 60/272 |
| 8,418,448 | B2 * | 4/2013 | Kamata | E02F 9/0866 60/299 |
| 8,505,661 | B2 * | 8/2013 | Tsuji | B60K 11/04 180/68.4 |
| 8,857,548 | B2 * | 10/2014 | Yamamoto | B60K 11/04 138/112 |
| 9,056,547 | B2 * | 6/2015 | Kimijima | F01N 3/0211 |
| 9,470,134 | B2 * | 10/2016 | Hirukawa | B60K 13/04 |
| 9,512,778 | B2 * | 12/2016 | Fukuyoshi | F01N 3/035 |
| 10,941,696 | B2 * | 3/2021 | Aratake | B62D 21/18 |
| 11,738,814 | B2 * | 8/2023 | Ono | B62D 33/02 181/282 |
| 12,428,983 | B2 * | 9/2025 | Laird | F01N 13/1811 |
| 12,492,653 | B2 * | 12/2025 | Beck | F01N 1/003 |

* cited by examiner

EXHAUST APPARATUS FOR AGRICULTURAL WORK VEHICLE AND AGRICULTURAL WORK VEHICLE

CROSS-REFERENCE TO RELATED APPLICATION

This application claims the benefit of Korean Patent Application No. 10-2022-0132284 filed on Oct. 14, 2022, which is hereby incorporated by reference herein in its entirety.

FIELD

The present disclosure relates to an agricultural work vehicle that is used to grow crops required to for human life by using land.

BACKGROUND

Agricultural work vehicles are used to grow crops required for human life by using land. For example, combines, tractors, etc. are agricultural work vehicles. Combines are used to cut and thresh crops such as rice, barley, wheat, soybeans, etc. Tractors perform the work required to grow crops by using traction force.

FIG. 1 is a conceptual side view showing the inside of a hood in a conventional agricultural work vehicle.

Referring to FIG. 1, a conventional agricultural work vehicle 100 includes an engine frame 110 and an exhaust apparatus 120. The engine frame 110 supports the engine 200 that generates driving force. The conventional agricultural work vehicle 100 performs predetermined tasks using the driving force generated by the engine 200. The engine 200 may be coupled to the engine frame 110 to be located inside a hood 300.

The exhaust apparatus 120 discharges the exhaust gas, generated in the engine 200, out of the hood 300. The exhaust apparatus 120 includes an intake part 121, a muffler 122, and an exhaust part 123.

The intake part 121 transfers the exhaust gas, generated in the engine 200, to the muffler 122. The intake part 121 is coupled to each of the engine 200 and the muffler 122 to connect the engine 200 and the muffler 122.

The muffler 122 reduces the noise that is generated in the process in which the exhaust gas generated in the engine 200 is discharged out of the hood 300. The exhaust gas generated in the engine 200 is supplied to the muffler 122 through the intake part 121, passes through the muffler 122, and is discharged out of the hood 300 through the exhaust part 123.

The exhaust part 123 discharges the exhaust gas, flowing in from the muffler 122, to the outside. One side of the exhaust part 123 is coupled to the muffler 122. Accordingly, the exhaust gas having passed through the muffler 122 flows into the exhaust part 123 through the one side of the exhaust part 123. The exhaust part 123 is disposed such that the other side thereof faces the outside of the hood 300. Accordingly, the exhaust gas is discharged out of the hood 300 through the other side of the exhaust part 123. The exhaust part 123 may be coupled to the engine 200 or the engine frame 110 so that the muffler 122 is supported on the engine 200 or the engine frame 110.

The muffler 122 may be supported on the engine 200 or the engine frame 110 through the intake part 121 and the exhaust part 123. The intake part 121 and the exhaust part 123 may couple the muffler 122 to the engine 200 or the engine frame 110 by being coupled to the engine 200 or the engine frame 110 in the state of being coupled to the muffler 122.

In this case, the conventional agricultural work vehicle 100 has a structure in which the muffler 122 is asymmetrically supported on the engine 200 or the engine frame 110 due to the different shapes of the intake part 121 and exhaust part 123 supporting the muffler 122 and the asymmetry between points at which the muffler 122 is supported by the intake part 121 and the exhaust part 123. Accordingly, in the conventional agricultural work vehicle 100, the vibration generated in the engine 200 is asymmetrically transferred to the muffler 122 through the intake part 121 and the exhaust part 123. Therefore, the conventional agricultural work vehicle 100 has the problem of causing damage or breakage to the muffler 122, the intake part 121, and/or the exhaust part 123 as the muffler 122 vibrates asymmetrically.

SUMMARY

The present disclosure has been conceived to overcome the above-described problems, and an object of the present disclosure is to provide an exhaust apparatus for an agricultural work vehicle and an agricultural work vehicle in which a muffler may alleviate the asymmetry of vibration transmitted through the support structure of an intake part and an exhaust part.

In order to overcome the above-described problems, the present disclosure may include the following configuration.

An exhaust apparatus for an agricultural work vehicle according to the present disclosure may include: a muffler configured to reduce noise that is generated in the process in which the exhaust gas generated in the engine of an agricultural work vehicle is discharged out of the agricultural work vehicle; an intake part coupled to each of the engine and the muffler in order to transfer the exhaust gas, generated in the engine, to the muffler, an exhaust part coupled to the muffler in order to discharge exhaust gas, having passed through the muffler, out of the agricultural work vehicle; and a vibration reduction part coupled to each of the intake part and the muffler in order to reduce the vibration of the muffler.

An agricultural work vehicle according to the present disclosure may include: an engine disposed to be located inside a hood; an engine frame configured to support the engine; an exhaust apparatus configured to discharge exhaust gas, generated in the engine, out of the hood. The exhaust apparatus may include: an intake part connected to the engine, and configured to suck in exhaust gas generated in the engine; a muffler coupled to the intake part; an exhaust part coupled to the muffler so that exhaust gas having passed through the muffler is discharged out of the hood; and a vibration reduction part coupled to each of the intake part and the muffler.

BRIEF DESCRIPTION OF THE DRAWINGS

The above and other objects, features, and advantages of the present disclosure will be more dearly understood from the following detailed description taken in conjunction with the accompanying drawings, in which.

DETAILED DESCRIPTION

An agricultural work vehicle according to an embodiment of the present disclosure will be described in detail below with reference to the accompanying drawings. Since an exhaust apparatus for an agricultural work vehicle according to the present disclosure may be included in the agricultural work vehicle according to the present disclosure, it will be described together with the agricultural work vehicle according to the embodiment of the present disclosure.

Figure 1:
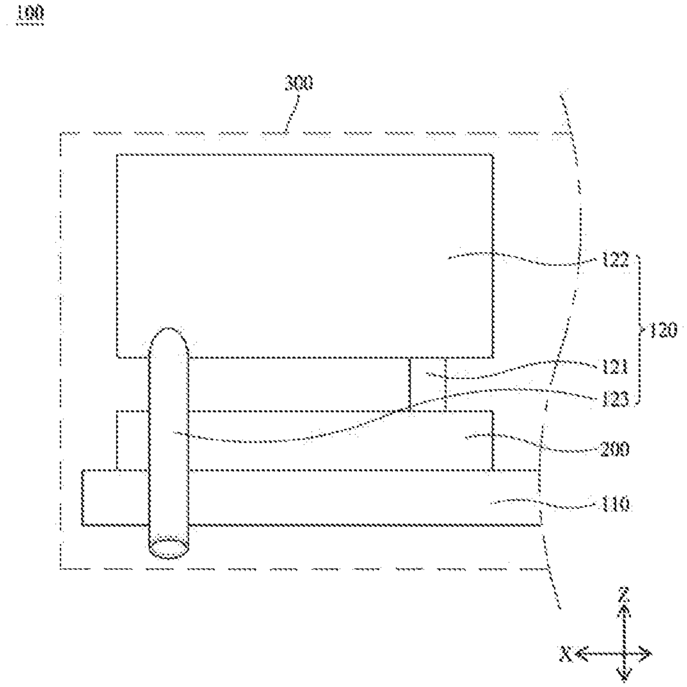
FIG. 1 is a conceptual side view showing the inside of a hood in a conventional agricultural work vehicle.
Figure 2:
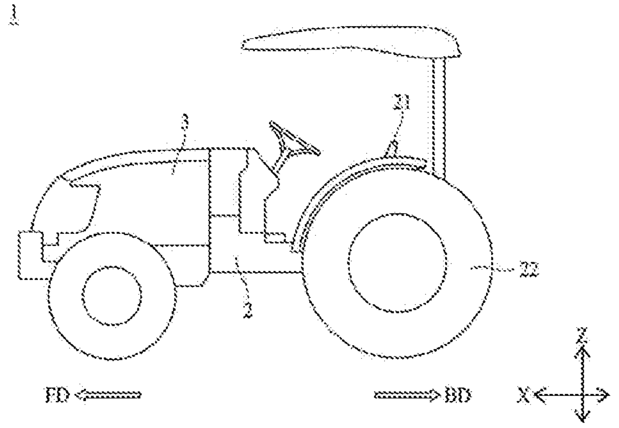
FIG. 2 is a schematic side view of an agricultural work vehicle according to the present disclosure.
Figure 3:
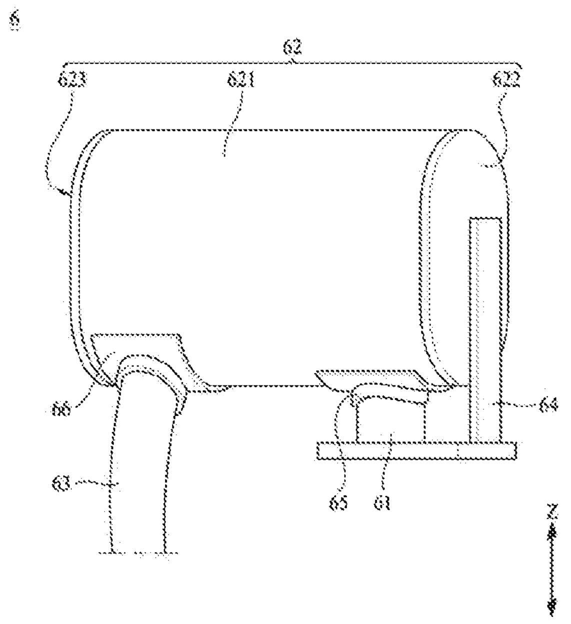
FIG. 3 is a schematic perspective view of an exhaust apparatus for an agricultural work vehicle according to the present disclosure.
Figure 4:
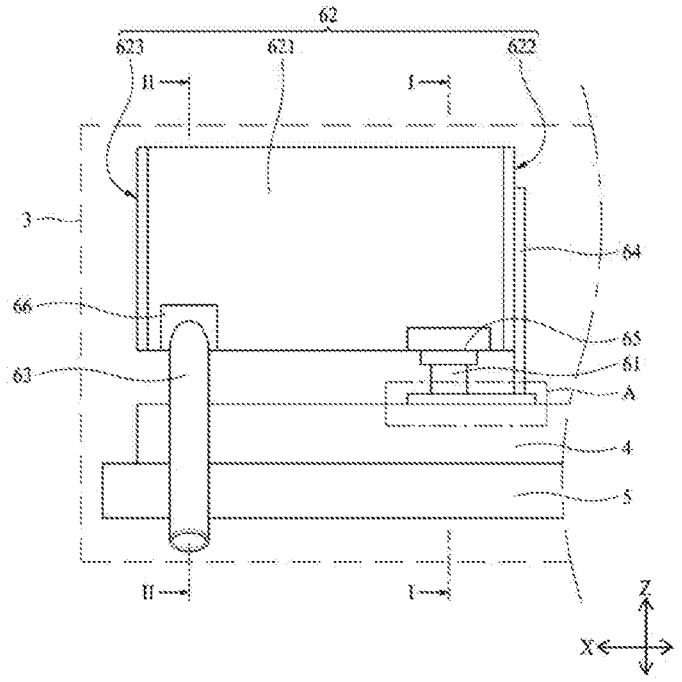
FIG. 4 is a schematic side view showing the inside of a hood in the agricultural work vehicle according to the present disclosure.

Referring to FIGS. 2 to 4, an agricultural work vehicle 1 according to the present disclosure is used to grow crops required for human life by using land. The agricultural work vehicle 1 according to the present disclosure may be a tractor, a combine, or the like.

The agricultural work vehicle 1 according to the present disclosure includes an engine 4 disposed inside a hood 3, an engine frame 5 configured to support the engine 4, and an exhaust apparatus 6 configured to discharge the exhaust gas, generated in the engine 4, out of the hood 3.

The exhaust apparatus 6 includes: an intake part 61 connected to the engine 4, and configured to suck in the exhaust gas generated in the engine 4; a muffler 62 coupled to the intake part 61; an exhaust part 63 coupled to the muffler 62 so that the exhaust gas having passed through the muffler 62 is discharged out of the hood 3; and a vibration reduction part 64. The muffler 62 may be supported on the engine 4 or the engine frame 5 by being coupled to the intake part 61 and the exhaust part 63. In this case, the agricultural work vehicle 1 according to the present disclosure is implemented such that the vibration reduction part 64 is coupled to the intake part 61 and the muffler 62.

Accordingly, the agricultural work vehicle 1 according to the present disclosure may disperse the vibration, transmitted to the muffler 62, using the vibration reduction part 64. Therefore, the agricultural work vehicle 1 according to the present disclosure may alleviate the degree to which the vibration generated in the engine 4 is asymmetrically transmitted to the muffler 62 compared to a comparative example in which the vibration reduction part 64 is not provided. Accordingly, in the agricultural work vehicle 1 according to the present disclosure, vibration is asymmetrically transmitted to the muffler 62, so that the coupling structure between the muffler 62, the intake part 61, and the exhaust part 63 can be prevented from being damaged or broken. Furthermore, in the agricultural work vehicle 1 according to the present disclosure, the vibration reduction part 64 is connected to the intake part 61 and the muffler 62, so that the vibration transmitted between the intake part 61 and the muffler 62 can be further dispersed. Therefore, the agricultural work vehicle 1 according to the present disclosure may further reduce the damage or breakage of the coupling portion between the intake part 61 and the muffler 62, which is more vulnerable than the coupling portion between the exhaust part 63 and the muffler 62, through the vibration reduction part 64.

The vehicle body 2, the hood 3, the engine 4, the engine frame 5, and the exhaust apparatus 6 will be described in detail below with reference to the accompanying drawings.

Referring to FIGS. 2 to 4, the vehicle body 2 forms the overall appearance of the agricultural work vehicle 1 according to the present disclosure. The vehicle body 2 is provided with a driver's seat 21. As the driver sits on the driver's seat 21 provided in the vehicle body 2 and operates a steering device and an operating device, the agricultural work vehicle 1 according to the present disclosure may perform predetermined tasks. Wheels 22 may be coupled to the vehicle body 2. The engine 4 may move the vehicle body 2 along a traveling direction by rotating the wheels 22. In this case, the traveling direction is the direction of an axis parallel to the forward direction (the direction of arrow FD) in which the vehicle body 2 moves forward and the backward direction (the direction of arrow BD) in which the vehicle body 2 moves backward.

Referring to FIGS. 2 to 4, the hood 3 is disposed to be positioned in front of the driver's seat 21 in the forward direction (the direction of arrow FD). The engine 4 and components connected to the engine 4 may be positioned inside the hood 3. The hood 3 may protect the engine 4 and the components connected to the engine 4 from the outside. The hood 3 may be coupled to at least one of the engine frame 5 and the vehicle body 2.

Referring to FIGS. 2 and 4, the engine 4 generates driving force. The agricultural work vehicle 1 according to the present disclosure may perform predetermined tasks by using the driving force generated by the engine 4. For example, the driving force generated by the engine 4 may be used to move the vehicle body 2 in the forward direction and the backward direction. The engine 4 may be positioned inside the hood 3. The engine 4 may be positioned inside the hood 3 by being coupled to the engine frame 5.

Referring to FIGS. 2 to 4, the engine frame 5 supports the engine 4. The engine 4 may be supported on the engine frame 5 by being coupled to the engine frame 5. The engine frame 5 may support the hood 3 and the vehicle body 2 as well as the engine 4. The engine frame 5 may serve as a main frame that forms a skeleton in the agricultural work vehicle 1 according to the present disclosure.

Referring to FIGS. 2 to 4, the exhaust apparatus 6 discharges the exhaust gas, generated in the engine 4, out of the hood 3. The exhaust apparatus 6 may be implemented as an exhaust apparatus for the agricultural work vehicle according to the present disclosure. The exhaust apparatus 6 includes the intake part 61, the muffler 62, the exhaust part 63, and the vibration reduction part 64.

Referring to FIGS. 2 to 4, the muffler 62 may reduce noise in the process in which the exhaust gas generated in the engine 4 is discharged out of the hood 3. The muffler 62 may be supported on at least one of the engine 4 and the engine frame 5. The muffler 62 may be supported on at least one of the engine 4 and the engine frame 5 through the intake part 61 and the exhaust part 63. For example, the muffler 62 may be supported on the engine 4 through the intake part 61, and may be supported on the engine frame 5 through the exhaust part 63. The muffler 62 may include a peripheral portion

621, a first side plate 622, and a second side plate 623. The peripheral portion 621 is disposed to surround the internal space 620 of the muffler 62. The peripheral portion 621 may be formed such that one side and the other side are open based on a first axis direction (the X-axis direction). The first axis direction (the X-axis direction) may be parallel to the traveling direction of the vehicle body 2. The first side plate 622 is coupled to one side of the peripheral portion 621. The first side plate 622 may be disposed to cover the one side of the peripheral portion 621. One side of the intake part 61 may be coupled to the peripheral portion 621. The vibration reduction part 64 may be coupled to the other side of the intake part 61 connected to the engine 4 and the first side plate 622 of the muffler 62, and may thus connect the intake part 61 and the muffler 62. Accordingly, the agricultural work vehicle 1 according to the present disclosure may further alleviate the degree to which the vibration generated by the engine 4 is asymmetrically transmitted to the muffler 62 by coupling the vibration reduction part 64 and the intake part 61 with different surfaces of the muffler 62, thereby further reducing the vibration of the muffler 62. Therefore, the agricultural work vehicle 1 according to the present disclosure may further prevent the intake part 61, the muffler 62, and the exhaust part 63 from being damaged or broken due to vibration of the muffler 62. The second side plate 623 is disposed to face the first side plate 622. The second side plate 623 may be coupled to the other side of the peripheral portion 621. The second side plate 623 may be disposed to cover the other side of the peripheral portion 621. One side surface of the peripheral portion 621 is closed by the first side plate 622 and the other side surface of the peripheral portion 621 is closed by the second side plate 623, so that both side surfaces of the peripheral portion 621 can be closed. Accordingly, the inner space 620 of the muffler 62 may be closed by the peripheral portion 621, the first side plate 622, and the second side plate 623.

Referring to FIGS. 2 to 8, the intake part 61 is intended to transfer the exhaust gas, generated in the engine 4, to the muffler 62. The intake part 61 may be coupled to the muffler 62 and the engine 4. One side of the intake part 61 may be coupled to the muffler 62. The one side of the intake part 61 may be coupled to the peripheral portion 621 of the muffler 62. The one side of the intake part 61 may be coupled to a portion other than the peripheral portion 621 of the muffler 62. The other side of the intake part 61 may be coupled to the engine 4. The exhaust gas generated in the engine 4 may be supplied into the intake part 61 through the other side of the intake part 61, may flow along the intake part 61, and may be supplied to the muffler 62 through the one side of the intake part 61. The one side of the intake part 61 may be coupled to the peripheral portion 621 at a position where the distance from the first side plate 622 is shorter than the distance from the second side plate 623. Accordingly, the agricultural work vehicle 1 according to the present disclosure may reduce the distance between the point where the intake part 61 is coupled to the muffler 62 and the point where the vibration reduction part 64 is coupled to the muffler 62, thereby further increasing the influence of the effect of reducing the vibration of the muffler 62 through the vibration reduction part 64 on the intake part 61. Therefore, even when the agricultural work vehicle 1 according to the present disclosure uses the same vibration reduction part 64, it may further prevent the coupling point between the intake part 61 and the muffler 62, which is particularly vulnerable to the vibration of the muffler 62, from being damaged or broken.

The exhaust part 63 discharges the exhaust gas, discharged from the muffler 62, out of the hood 3. One side of the exhaust part 63 may be coupled to the muffler 62. Accordingly, the exhaust gas discharged from the muffler 62 may flow into the exhaust part 63 through the one side of the exhaust part 63. The exhaust part 63 may discharge exhaust gas through the other side thereof. The other side of the exhaust part 63 may be positioned outside the hood 3. The exhaust part 63 may include an exhaust pipe 631. The exhaust pipe 631 serves as a passage for the exhaust gas discharged from the muffler 62. The exhaust pipe 631 may be formed as a hollow, long cylindrical pipe as a whole. The exhaust pipe 631 may include an exhaust space 631*a* adapted to pass exhaust gas therethrough. The exhaust space 631*a* may be in communication with the inner space 620. Accordingly, the exhaust gas having passed through the muffler 62 may pass through the exhaust space 631*a* of the exhaust pipe 631 and be discharged out of the hood 3.

Referring to FIGS. 3 to 7, the intake part 61 may include an intake pipe 611, a flange 612 coupled to the intake pipe 611, and a protrusion 613 coupled to the flange 612.

The intake pipe 611 serves as a passage for the exhaust gas generated in the engine 4. The intake pipe 611 may be formed as a hollow, long cylindrical pipe as a whole. The intake pipe 611 may include an intake space 611*a* adapted to pass exhaust gas therethrough. The intake space 611*a* may be in communication with the inner space 620. Accordingly, the exhaust gas generated in the engine 4 may be supplied to the muffler 62 by passing through the intake space 611*a* of the intake pipe 611 and then moving to the inner space 620.

The flange 612 is intended to support the intake pipe 611 on the engine 4. The flange 612 may be formed to protrude outward from the intake pipe 611. The flange 612 may be mounted and coupled onto the engine 4. Accordingly, the intake pipe 611 may be more securely supported on the engine 4.

The protrusion 613 is intended to connect the vibration reduction part 64 and the flange 612. The protrusion 613 may protrude from the flange 612 toward the vibration reduction part 64, and may thus be coupled to each of the flange 612 and the vibration reduction part 64. The flange 612 and the vibration reduction part 64 may be connected to each other through the protrusion 613. Accordingly, the vibration reduction part 64 may be supported on the flange 612 through the protrusion 613. Therefore, the agricultural work vehicle 1 according to the present disclosure is implemented such that the flange 612 and the vibration reduction part 64 are connected without bending at least one of the flange 612 and the vibration reduction part 64, arranged to be spaced apart from each other, toward the other one. Accordingly, the agricultural work vehicle 1 according to the present disclosure reduces the number of working hours for connecting the flange 612 and the vibration reduction part 64, which are arranged spaced apart from each other, and reduces the manufacturing cost while lowering the defect rate of products. The vibration reduction part 64 may be coupled to the protrusion 613 to connect the intake part 61 and the muffler 62.

Figure 5:
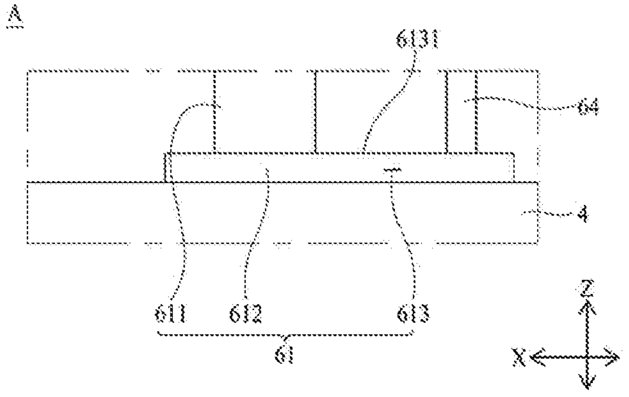
FIG. 5 is an enlarged partial side view showing portion A of FIG. 4 in the agricultural work vehicle according to the present disclosure.

The protrusion 613 may protrude from the flange 612 by the length that allows the vibration reduction part 64 to be disposed parallel to the vertical direction. For example, when the flange 612 is disposed parallel to the horizontal direction (the X-axis direction) as shown in FIGS. 4 and 5, the protrusion 613 may extend from the flange 612 in the horizontal direction (the X-axis direction) and may thus be implemented to support the vibration reduction part 64 disposed parallel to the vertical direction (the Z-axis direction). The horizontal direction (the X-axis direction) and the vertical direction (the Z-axis direction) may be perpendicular to each other. Accordingly, the agricultural work vehicle 1 according to the present disclosure is implemented such that the vibration reduction part 64 is disposed parallel to the vertical direction (the Z-axis direction), so that the vibration reduction part 64 is implemented such that it can be supported on the flange 612, spaced apart in the horizontal direction (the X-axis direction), through the protrusion 613 without a separate bending process, thereby reducing the number of working hours and reducing the manufacturing cost while lowering the defect rate of products. The protrusion 613 may include a support surface 6131 adapted to support the vibration reduction part 64. The support surface 6131 may be disposed beneath the vibration reduction part 64 and support the vibration reduction part 64. Accordingly, the agricultural work vehicle 1 according to the present disclosure is implemented to support the vibration reduction part 64 in the direction opposite to the direction of its own weight on the bottom of the vibration reduction part 64 through the support surface 6131 of the protrusion 613. Therefore, the agricultural work vehicle 1 according to the present disclosure may fundamentally prevent the coupled portion between the vibration reduction part 64 and the protrusion 613 from being damaged or broken due to the vibration reduction part 64's own weight, so that the connection stability between the flange 612 and the vibration reduction part 64 using the protrusion 613 can be further improved.

Figure 6:
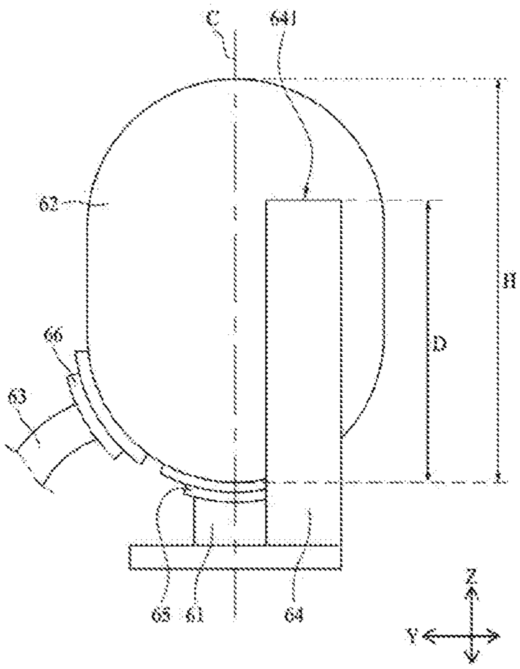
FIG. 6 is a schematic rear view of an exhaust apparatus for an agricultural work vehicle according to the present disclosure.

Referring to FIGS. 4 and 6, the vibration reduction part 64 may overlap and be coupled to one side of the muffler 62. In this case, the length over which the vibration reduction part 64 overlaps the muffler 62 may be 0.5 times or more than the length of one side of the muffler 62. For example, the vibration reduction part 64 may include a reduction top end 641 disposed at the uppermost end based on the vertical direction (the Z-axis direction). The distance by which the reduction top end 641 may be spaced apart from the lowermost end of the muffler 62 based on the vertical direction (the Z-axis direction) is 0.5 times or more than the height of the muffler 62. Accordingly, the agricultural work vehicle 1 according to the present disclosure may be implemented such that based on the vertical direction (the Z-axis direction), the length D over which the vibration reduction part 64 and the muffler 62 overlap each other is 0.5 times or more than the height H of the muffler 62. Therefore, the agricultural work vehicle 1 according to the present disclosure may increase the coupling area between the vibration reduction part 64 and the muffler 62 by increasing the area where the vibration reduction part 64 and the muffler 62 overlap each other. Accordingly, the agricultural work vehicle 1 according to the present disclosure may increase the coupling force between the vibration reduction part 64 and the muffler 62, and may further increase the effect of dispersing the vibration transmitted to the muffler 61 by using the vibration reduction part 64. In this case, the thickness of the vibration reduction part 64 may be smaller than the thickness of the first side plate 622. Accordingly, the agricultural work vehicle 1 according to the present disclosure may prevent the first side plate 622 from melting due to excessive heat transfer when the vibration reduction part 64 and the first side plate 622 are welded together, compared a comparative example in which the thickness of the vibration reduction part 64 is thicker than the thickness of the first side plate 622. Overall, in the agricultural work vehicle 1 according to the present disclosure, the thickness of the vibration reduction part 64 is implemented to be smaller than the thickness of the first side plate 622, so that the first side plate 622 can be prevented from being damaged in the process of welding the vibration reduction part 64 and the first side plate 622. Furthermore, based on the vertical direction (the Z-axis direction), the length D over which the vibration reduction part 64 and the muffler 62 overlap each other is 0.5 times or more than the height H of the muffler 62, and thus the thickness of the vibration reduction part 64 may become smaller, so that the coupling force for the muffler 62 or the vibration dispersion force for the muffler 62 can be prevented from being reduced.

Referring to FIGS. 4 and 6, in the exhaust apparatus 6 of the agricultural work vehicle 1 according to the present disclosure, the exhaust part 63 may be off-centered and coupled to one side of the muffler 62. In this case, the vibration reduction part 64 may be coupled to the other side of the muffler 62 other than one side of the muffler 62, to which the exhaust part 63 is coupled, based on the center of the muffler 62. Accordingly, the exhaust part 63 and the vibration reduction part 64 may be disposed to be spaced apart on both sides of the center of the muffler 62.

According to an embodiment of the present disclosure, the exhaust part 63 and the intake part 61 may be disposed to be spaced apart from each other based on the first axis direction (the X-axis direction). In this case, the exhaust part 63 and the vibration reduction part 64 may be disposed to be spaced apart from each other based on the second axis direction (the Y-axis direction) perpendicular to the first axis direction (the X-axis direction). Accordingly, the agricultural work vehicle 1 according to the present disclosure may improve installation stability by correcting the center of gravity of the exhaust apparatus 6 based on the second axis direction (the Y-axis direction) through the vibration reduction part 64 even when the exhaust part 63 is disposed off-centered from the center of the muffler 62 based on the second axis direction (the Y-axis direction). An intermediate point spaced at the same distance from both ends of the muffler 62 based on the second axis direction (the Y-axis direction) may be disposed between the exhaust part 63 and the vibration reduction part 64. For example, as shown in FIG. 6, the exhaust part 63 may be disposed on one side of an imaginary center line C spaced at the same distance from both ends of the muffler 62 in the second axis direction (the Y-axis direction), and the vibration reduction part 64 may be disposed on the other side thereof. The agricultural work vehicle 1 according to the present disclosure may be implemented such that the center of the muffler 62 is positioned between the exhaust part 63 and the vibration reduction part 64 based on the second ax direction (the Y-axis direction), so that the installation stability can be further improved by further correcting the center of gravity of the exhaust apparatus 6. The muffler 62 may be formed symmetrically with respect to the center line C. Accordingly, the center of gravity of the muffler 62 may be positioned on the center line C, so that an implementation may be made such that the center of gravity of the muffler 62 is positioned between the exhaust part 63 and the vibration reduction part 64. Therefore, the agricultural work vehicle 1 according to the present disclosure may further improve the installation stability by further correcting the center of gravity of the exhaust apparatus 6.

Figure 7:
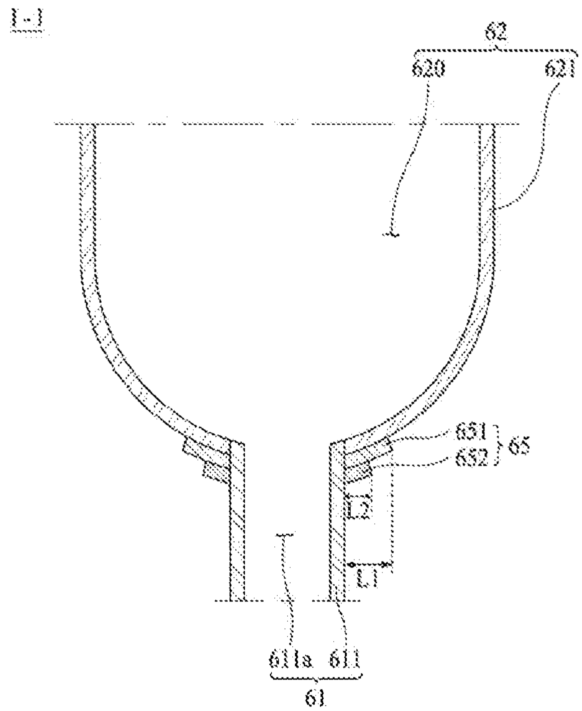
FIG. 7 is a schematic side sectional view of a muffler, an intake part, and an intake reinforcement portion taken along line I-I of FIG. 4.
Figure 8:
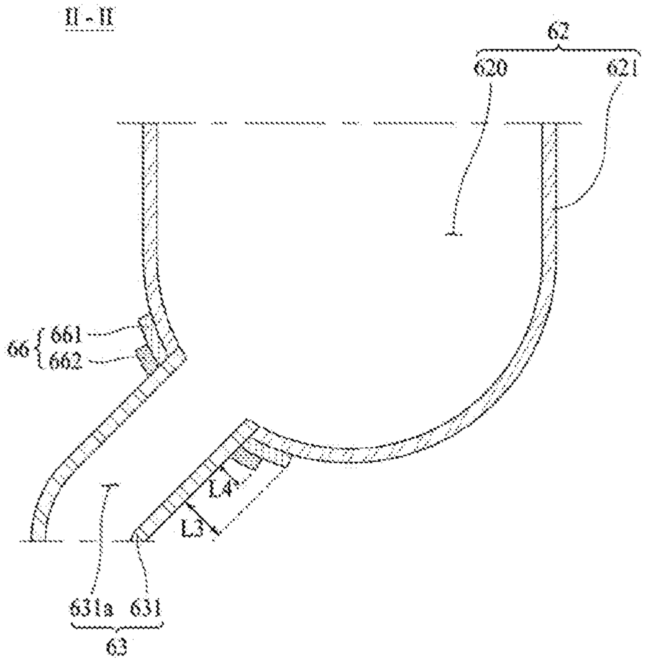
FIG. 8 is a schematic side sectional view of the muffler, an exhaust part, and an exhaust reinforcement portion taken along line II-II of FIG. 4.

Referring to FIGS. 4, 7, and 8, the exhaust apparatus 6 may further include an intake reinforcement portion 65 and an exhaust reinforcement portion 66.

The intake reinforcement portion 65 is intended to reinforce the coupled portion between the intake part 61 and the muffler 62. The intake reinforcement portion 65 may be coupled to each of the intake part 61 and the muffler 62. The intake reinforcement portion 65 may be coupled to at least a portion of the peripheral portion 621 of the muffler 62, and may be coupled to the intake part 61 to surround at least a portion of the intake pipe 611. Accordingly, the intake reinforcement portion 65 may increase the coupling force between the intake part 61 and the muffler 62, and may protect the coupled portion between the intake part 61 and the muffler 62 from external shock.

The intake reinforcement portion 65 may include a first intake reinforcement member 651 (shown in FIG. 7) coupled to the intake part 61 and a second intake reinforcement member 652 (shown in FIG. 7) coupled to the first intake reinforcement member 651. The first intake reinforcing member 651 may protrude from the outer surface of the intake part 61 in a first outward direction by a first length L1. The second intake reinforcing member 652 may protrude from the outer surface of the intake part 61 in the first outward direction by a second length L2 that is shorter than the first length L1. In this case, the first intake reinforcement member 651 may be disposed closer to the muffler 62 than the second intake reinforcement member 652. The first outward direction refers to the direction from the intake part 61 toward the muffler 62. The first outward direction may be parallel to the direction from the intake space 611*a* toward the intake pipe 611. Accordingly, the agricultural work vehicle 1 according to the present disclosure may alleviate the phenomenon in which the cross-sectional area rapidly widens in the direction from the intake part 61 toward the muffler 62 through the first intake reinforcement member 651 and the second intake reinforcement member 652. Therefore, the agricultural work vehicle 1 according to the present disclosure may alleviate the phenomenon in which stress is concentrated on the coupled portion between the intake part 61 and the muffler 62 due to the edge structure compared to a comparative example in which the first intake reinforcement member 651 and the second intake reinforcement member 652 are not provided. Accordingly, the agricultural work vehicle 1 according to the present disclosure may prevent the intake part 61 and the muffler 62 from being separated from each other or being damaged or broken because stress is concentrated on the coupled area between the intake part 61 and the muffler 62 due to the vibration of the engine 4.

The exhaust reinforcement portion 66 is intended to reinforce the coupled portion between the exhaust part 63 and the muffler 62. The exhaust reinforcement portion 66 may be coupled to each of the exhaust part 63 and the muffler 62. The exhaust reinforcement portion 66 may be coupled to at least a portion of the peripheral portion 621 of the muffler 62, and may be coupled to the exhaust part 63 to surround at least a portion of the exhaust pipe 631. Accordingly, the exhaust reinforcement portion 66 may increase the coupling force between the exhaust part 63 and the muffler 62, and may protect the coupled portion between the exhaust part 63 and the muffler 62 from external shock.

The exhaust reinforcement portion 66 may include a first exhaust reinforcement member 661 (shown in FIG. 8) coupled to the exhaust part 63, and a second exhaust reinforcement member 662 (shown in FIG. 8) coupled to the first exhaust reinforcement member 661. The first exhaust reinforcement member 661 may protrude from the outer surface of the exhaust part 63 in a second outward direction by a third length L3, and the second exhaust reinforcement member 662 may protrude from the outer surface of the exhaust part 63 in the second outward direction by a fourth length L4 that is shorter than the third length L. In this case, the first exhaust reinforcement member 661 may be disposed closer to the muffler 62 than the second exhaust reinforcement member 662. The second outward direction refers to the direction from the exhaust part 63 toward the muffler 62. The second outward direction may be parallel to the direction from the exhaust space 631*a* toward the exhaust pipe 631. Accordingly, the agricultural work vehicle according to the present disclosure may alleviate the phenomenon in which the cross-sectional area rapidly widens in the direction from the exhaust part 63 toward the muffler 62 through the first exhaust reinforcing member 661 and the second exhaust reinforcing member 662. Therefore, the agricultural work vehicle 1 according to the present disclosure may alleviate the phenomenon in which stress is concentrated on the coupled portion between the exhaust part 63 and the muffler 62 due to the edge structure, compared to a comparative example in which the first exhaust reinforcement member 661 and the second exhaust reinforcement member 662 are not provided. Accordingly, the agricultural work vehicle 1 according to the present disclosure may prevent the exhaust part 63 and the muffler 62 from being separated from each other or being damaged or broken because stress is concentrated on the coupled area between the exhaust part 63 and the muffler 62 due to the vibration of the engine 4.

The present disclosure described above is not limited to the above-described embodiments and the accompanying drawings. It will be apparent to a person having ordinary skill in the art to which the present disclosure pertains that various substitutions, modifications, and changes may be made without departing from the technical spirit of the present disclosure.

According to the present disclosure, the following effects may be achieved.

The present disclosure is implemented to disperse the vibration, transmitted to the muffler, using a vibration reduction part. Accordingly, the present disclosure may alleviate the degree to which the vibration generated in the engine is asymmetrically transmitted to the muffler.

The present disclosure is implemented to further disperse vibration transmitted between the intake part and the muffler by connecting the vibration reduction part to each of the intake part and the muffler. Accordingly, the present disclosure may further prevent the coupled area between the intake part and the muffler, which is particularly vulnerable to the vibration generated in the engine, from being damaged or broken.

What is claimed is:

1. An agricultural work vehicle comprising:

an engine located under a hood;

an engine frame configured to support the engine;

an exhaust apparatus configured to discharge exhaust gas, generated by the engine, out of the hood;

wherein the exhaust apparatus comprises:

an intake part connected to the engine, and configured to suck in exhaust gas generated by the engine;

a muffler coupled to the intake part;

an exhaust part coupled to the muffler so that exhaust gas having passed through the muffler is discharged out of the hood; and a vibration reduction part coupled to each of the intake part and the muffler, wherein:

the muffler comprises a peripheral portion extending in an X-axis direction and a first side plate coupled to one side of the peripheral portion to close off the one side of the peripheral portion, wherein the X-axis direction is a direction parallel to a traveling direction of a vehicle body of the agricultural work vehicle, one side of the intake part is coupled to the peripheral portion of the muffler and a remaining side of the intake part is coupled to the engine, the vibration reduction part is fixedly coupled to each of the remaining side of the intake part and the first side plate of the muffler, and the vibration reduction part is coupled to abut against the first side plate of the muffler.

2. The agricultural work vehicle of claim 1, wherein:

the intake part comprises an intake pipe, a flange coupled to the intake pipe, and a protrusion formed to protrude from the flange toward the vibration reduction part; and the vibration reduction part is coupled to the protrusion, and connects the intake part and the muffler.

3. The agricultural work vehicle of claim 1, wherein:

a length which the vibration reduction part abuts against the first side plate of the muffler is 0.5 times or more than a length of the first side plate of the muffler in a Z-axis direction, wherein the Z-axis direction is a gravity direction perpendicular to the X-axis direction.

4. The agricultural work vehicle of claim 3, wherein:

a thickness of the vibration reduction part is smaller than a thickness of the first side plate.

5. The agricultural work vehicle of claim 1, wherein:

the exhaust part is off-centered in a Y-axis direction and coupled to one side of the muffler, wherein the Y-axis direction is perpendicular to the X-axis direction and perpendicular to a Z-axis direction, which is a gravity direction;

the vibration reduction part is coupled to a remaining side of the muffler in the Y-axis direction, based on a center of the muffler; and the exhaust part and the vibration reduction part are arranged to be spaced apart on both sides of the center of the muffler in the Y-axis direction.

6. The agricultural work vehicle of claim 1, wherein:

the exhaust apparatus comprises an intake reinforcement portion coupled to each of the intake part and the muffler;

the intake reinforcement portion comprises a first intake reinforcement member coupled to the intake part, and a second intake reinforcement member coupled to the first intake reinforcement member;

the second intake reinforcement member is arranged on the first intake reinforcement member to at least partially cover the first intake reinforcement member;

the first intake reinforcement member protrudes by a first length in a direction away from a central axis of the intake part;

the second intake reinforcement member protrudes by a second length that is shorter than the first length in the direction away from the central axis of the intake part; and the first intake reinforcement member is disposed closer to the muffler than the second intake reinforcement member.

7. The agricultural work vehicle of claim 1, wherein:

the exhaust apparatus comprises an exhaust reinforcement portion coupled to each of the exhaust part and the muffler;

the exhaust reinforcement portion comprises a first exhaust reinforcement member coupled to the exhaust part, and a second exhaust reinforcement member coupled to the first exhaust reinforcement member;

the second exhaust reinforcement member is arranged on the first exhaust reinforcement member to at least partially cover the first reinforcement member;

the first exhaust reinforcement member protrudes from by a third length in a direction away from a central axis of the exhaust part;

the second exhaust reinforcement member protrudes by a fourth length that is shorter than the third length in the direction away from the central axis of the exhaust part; and the first exhaust reinforcement member is disposed closer to the muffler than the second exhaust reinforcement member.

* * * * *